United States Patent
Zhang et al.

(10) Patent No.: US 10,046,824 B2
(45) Date of Patent: Aug. 14, 2018

(54) ELECTRIC VEHICLE

(71) Applicant: Junkai Zhang, Shanghai (CN)

(72) Inventors: Junkai Zhang, Shanghai (CN); Xin Zhang, Shanghai (CN)

(73) Assignee: Junkai Zhang, Shanghai (CN)

( * ) Notice: Subject to any disclaimer, the term of this patent is extended or adjusted under 35 U.S.C. 154(b) by 0 days.

(21) Appl. No.: 15/169,468

(22) Filed: May 31, 2016

(65) Prior Publication Data
US 2017/0217526 A1 Aug. 3, 2017

(30) Foreign Application Priority Data
Feb. 1, 2016 (CN) .......................... 2016 1 0072561

(51) Int. Cl.
| | |
|---|---|
| *B62K 1/00* | (2006.01) |
| *B62M 7/12* | (2006.01) |
| *B62J 25/00* | (2006.01) |
| *B62K 3/00* | (2006.01) |

(52) U.S. Cl.
CPC ................ *B62K 1/00* (2013.01); *B62J 25/00* (2013.01); *B62K 3/002* (2013.01); *B62K 3/007* (2013.01); *B62M 7/12* (2013.01)

(58) Field of Classification Search
CPC .......... B62K 1/00; B62K 3/002; B62K 3/007; B62M 7/12; B62J 25/00
See application file for complete search history.

(56) References Cited

U.S. PATENT DOCUMENTS

| | | | | |
|---|---|---|---|---|
| 2,971,773 A | * | 2/1961 | McKissick | ............... B62K 1/00 188/5 |
| 6,278,216 B1 | * | 8/2001 | Li | ......................... B60K 7/0007 310/424 |
| 6,949,864 B2 | * | 9/2005 | Maslov | .................... B62M 6/40 310/254.1 |
| 7,579,738 B2 | * | 8/2009 | Cros | ................... B60L 11/1803 310/216.004 |
| 7,690,452 B2 | * | 4/2010 | Kamen | ............... B60L 15/2036 180/282 |

(Continued)

FOREIGN PATENT DOCUMENTS

| | | |
|---|---|---|
| CN | 102457119 A | 5/2002 |
| CN | 204184521 U | 3/2015 |
| JP | 2012096595 A | 5/2012 |

OTHER PUBLICATIONS

EPO Communication and partial European Search Report dated Jun. 19, 2017 for European Application No. 16174162.4, 15 pages.

*Primary Examiner* — Paul N Dickson
*Assistant Examiner* — Timothy Wilhelm
(74) *Attorney, Agent, or Firm* — Squire Patton Boggs (US) LLP (57) ABSTRACT

The present invention refers to an electric vehicle. As compared with the solution in prior art which is that assembling the finished product of wheel hub motor with the casing, the inventor of present invention creatively dismantles the structure of the original finished product of wheel hub motor with discarding at least one hub cover. Such solution simplifies the structures and reduces the weights of the wheel hub motor and the electric vehicle, moreover, it can reduce the gap between the casing and the wheel hub motor and thus decrease the overall thickness of the electric vehicle, especially decrease the thickness of the electric unicycle for easy to carry.

18 Claims, 12 Drawing Sheets

(56) References Cited

U.S. PATENT DOCUMENTS

| | | | | |
|---|---|---|---|---|
| 8,403,084 B2* | 3/2013 | Gomi | ................ | B60B 3/048 |
| | | | | 180/10 |
| 8,702,549 B2* | 4/2014 | Yoshino | ............ | B60K 7/0007 |
| | | | | 475/149 |
| 8,841,815 B2* | 9/2014 | Vuolle-Apiala | ......... | H02K 1/30 |
| | | | | 29/598 |
| 9,061,576 B2* | 6/2015 | Kim | ................ | B62M 7/12 |
| 9,308,965 B2* | 4/2016 | Folmli | ................ | B62M 6/65 |
| 2011/0220427 A1* | 9/2011 | Chen | ................ | B62K 1/00 |
| | | | | 180/21 |
| 2011/0259658 A1* | 10/2011 | Huang | ................ | B60K 1/04 |
| | | | | 180/65.51 |
| 2011/0291499 A1* | 12/2011 | Nagao | ................ | H02K 5/08 |
| | | | | 310/43 |
| 2013/0154397 A1* | 6/2013 | Sullivan | ............. | H02K 21/00 |
| | | | | 310/12.18 |

* cited by examiner

ELECTRIC VEHICLE

This application claims priority to a Chinese patent application (Chinese Appl. No. 201610072561.1, entitled "An electric vehicle", filed on Feb. 1, 2016), the contents of which are incorporated herein by reference in its entirety.

TECHNICAL FIELD

The present invention relates to an electric vehicle, and more particularly to an electric vehicle with an improved structure of wheel hub motor thereof.

BACKGROUND

The wheel hub motor, also known as built-in motor of wheel, integrates power unit and drive control unit, etc., into the wheel hub, thereby making the mechanical part of the electric vehicle being greatly simplified.

Typically, a wheel hub motor at least comprises a shaft, a hub pivoted to the shaft, a rotor mounted on the hub and rotated together with the hub, a stator corresponding with the rotor and a hub housing. The hub housing comprises a left cover arranged at the left side of the hub and a right cover arranged at the right side of the hub, which enclose the central portion of hub and such members like the rotor and the stator, to serve the functions of waterproof and dustproof.

While the wheel hub motor is mounted in the electric vehicle, especially mounted in the self-balancing vehicle with one wheel or two wheels, the general installation scheme is that using a bracket to fix the shaft, and then applying the casing of electric vehicle to cover the wheel hub from top down, and fixing the casing to the bracket to realize the relative fixation between the casing and the shaft. Generally speaking, the casing of electric vehicle at least partially covers each side of the wheel hub and exposes the tire below the wheel hub motor for the running of electric vehicle.

Up to now, the electric vehicle manufactures generally purchase finished product of wheel hub motor with appropriate performance parameters directly, and then assemble it into the electric vehicle.

However, since the wheel hub motor is rotating all the time during the running process, especially its left cover and right cover are rotating, the casing and such units like battery and driver arranged inside the casing should avoid from the rotating wheel hub motor. Thus, the left cover and the right cover of wheel hub motor should be both kept a certain distance away from the inner wall of casing, which results in large thickness and dimension of the entirety of electric vehicle. On the other hand, the wheel hub motor and the entire electric vehicle are very heavy. These factors mentioned above cause the electric vehicle, especially the self-balancing electric vehicle, inconvenient to take along.

SUMMARY

To overcome the technical problems above, one object of present invention is to provide an electric vehicle, comprising a casing and a wheel hub motor assembled inside said casing, said casing at least partially covering each of two sides of said wheel hub motor, wherein, said wheel hub motor comprises a shaft, a hub and a motor unit for driving the rotation of said hub; said motor unit comprises a stator and a rotor which are arranged correspondingly to each other; said electric vehicle further comprises an installation member for fixedly mounting said stator; said installation member is fixedly mounted on the inner wall of said casing, or, said installation member is close to the inner wall of said casing and arranged fixedly related to said casing; said stator is arranged fixedly relative to said hub; and, said hub is rotatably connected to said casing by said shaft.

As a further aspect, said casing comprises a first side casing by one side of said wheel hub motor and a second side casing by the other side of said wheel hub motor.

As a further aspect, said wheel hub motor further comprises a first hub cover disposed at one side of said hub; said first hub cover and said first side casing are at the same side, a space is formed between said first hub cover and said second side casing, and said motor unit is accommodated in the space; or, said first hub cover and said second side casing are at the same side, a space is formed between said first hub cover and said first side casing, and said motor unit is accommodated in the space.

As a further aspect, said wheel hub motor comprises one hub, which is arranged with at least one motor unit correspondingly, and each of said motor unit comprises at least one said stator and at least one said rotor which are arranged correspondingly to each other.

As a further aspect, said wheel hub motor comprises two hubs which are both coupled to said shaft and have the same dimension, each of said hubs is arranged with at least one motor unit correspondingly, and each of said motor units comprises at least one said stator and at least one said rotor which are arranged correspondingly to each other.

As a further aspect, said installation member is used for detachably mounting said stator, and, a circumferential stopping mechanism is configured between said installation member and said stator for preventing said stator from moving in its circumferential direction relative to said installation member, and an axial stopping mechanism is configured between said installation member and said stator for preventing said stator from moving in its axial direction relative to said installation member.

As a further aspect, said circumferential stopping mechanism comprises at least one protruded rib extending in the axial direction and disposed on an outer circumference surface of installation member and at least one groove correspondingly disposed on an inner circumference surface of said stator and engaged with said protruded rib; said axial stopping mechanism comprises at least one pair of bolt and bolt hole, said bolt hole is disposed in said installation member with extending in the axial direction.

As a further aspect, said hub is fixedly connected with said shaft, and said shaft is pivotally connected with said casing.

As a further aspect, the two lateral inner walls of said casing are respectively provided with a blind hole which is pivotally coupled to said shaft.

As a further aspect, said hub is pivotally connected with said shaft, and said shaft is fixedly connected with said casing.

As a further aspect, said installation member is fixedly mounted on said shaft.

As a further aspect, both side inner walls of said casing are respectively provided with a blind hole which is fixedly coupled to said shaft.

As a further aspect, said stator is disposed inside a hollow space of said rotor to allow said stator and said rotor corresponding to each other, or said rotor is disposed inside a hollow space of said stator to allow said stator and said rotor corresponding to each other.

As a further aspect, said rotor comprises an annular assembly of permanent magnets and an annular metal member; said annular metal member fixedly disposed on the internal circumference surface of said hub, and said annular assembly of permanent magnets is attached on the internal circumference wall of said annular metal member.

As a further aspect, said annular metal member is molded integrally with said hub.

As a further aspect, said casing is selected from a cover, a covering net, a bracket or the combination thereof.

As a further aspect, said electric vehicle is a self-balancing electric vehicle.

As compared with the solution in prior art which is that assembling the finished product of wheel hub motor into the electric vehicle directly, the inventor(s) of present invention dismantles the structure of the original finished product of wheel hub motor with discarding at least one hub cover. Such solution simplifies the structures and reduces the weights of the wheel hub motor and the electric vehicle. Moreover, it can reduce the gap between the casing and the hub and thus decrease the overall thickness of the electric vehicle, especially decrease the thickness of the electric unicycle for easy to carry.

DETAILED DESCRIPTION

Hereinafter, embodiments are described in detail with reference to the accompanying drawings. However, these implementations set forth in the following description of exemplary embodiments do not limit the protection scope of present invention, and the transformations, variations or modifications of structure, method or function which are made by the ordinary persons in the art according to these implementations are all included within the protection scope of present invention.

Herein, the terms such as "first", "second" and the like used in present invention are intend to be convenient for description and understanding, and not to include other specifically defined meaning, unless otherwise indicated.

The First Embodiment

As shown in FIGS. 1 to 6, an electric unicycle of an exemplary embodiment, mainly comprises a casing 1 and a wheel hub motor 2 assembled inside the casing 1. The casing 1 at least partially covers each of two sides of the wheel hub motor 2 and exposes the tire below the wheel hub motor 2 for the running of electric unicycle.

The term "casing" in the application means the member arranged outside of the wheel of electric vehicle, could be any member surround the outside of the wheel of electric vehicle, such as a cover, a net or a bracket serving as a wheel casing or their combinations.

In this embodiment, the casing 1 is a wheel cover 1. In some alternative embodiments of present invention, the casing 1 may further comprise other accessories or components fixedly disposed (such as welding, integral molding, or other fixing pattern) inside or outside of the wheel cover 1.

In some alternative embodiments of present invention, the casing 1 may be a wheel net. In other alternative embodiments of present invention, the casing 1 may be a wheel bracket. In some further alternative embodiments of present invention, the casing 1 may include a wheel cover and a bracket fixedly disposed inside or outside of the wheel cover.

In some alternative embodiments of present invention, the casing 1 may have a structure with a integral molding pattern or a plurality of components connected together.

Figure 1:
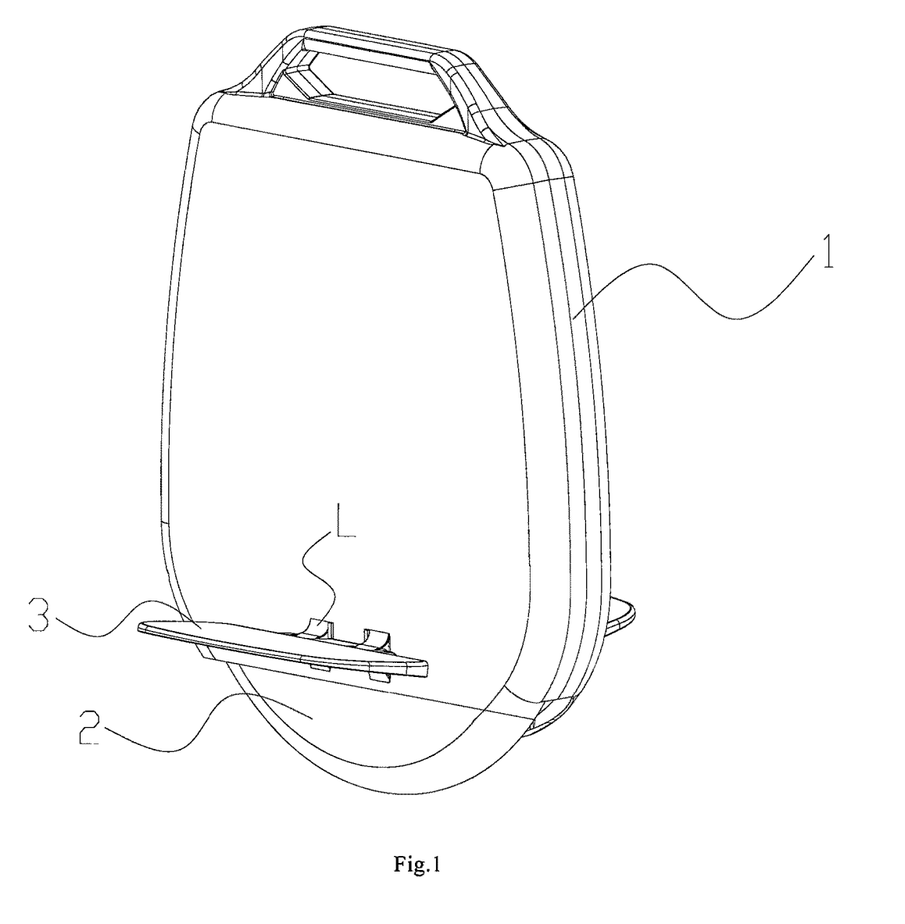
FIG. 1 is a perspective view of the electric unicycle provided by the first embodiment of the invention.
Figure 2:
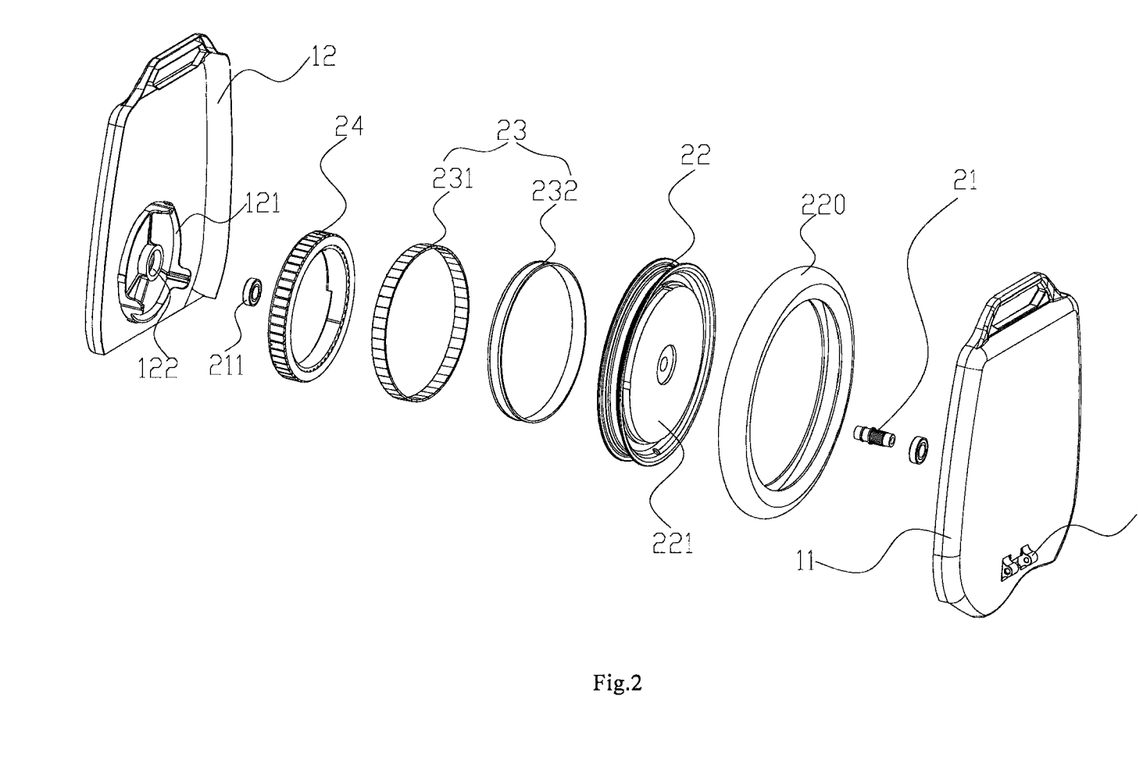
FIG. 2 is an exploded view of partial structure of the electric unicycle provided by the first embodiment of the invention.
Figure 3:
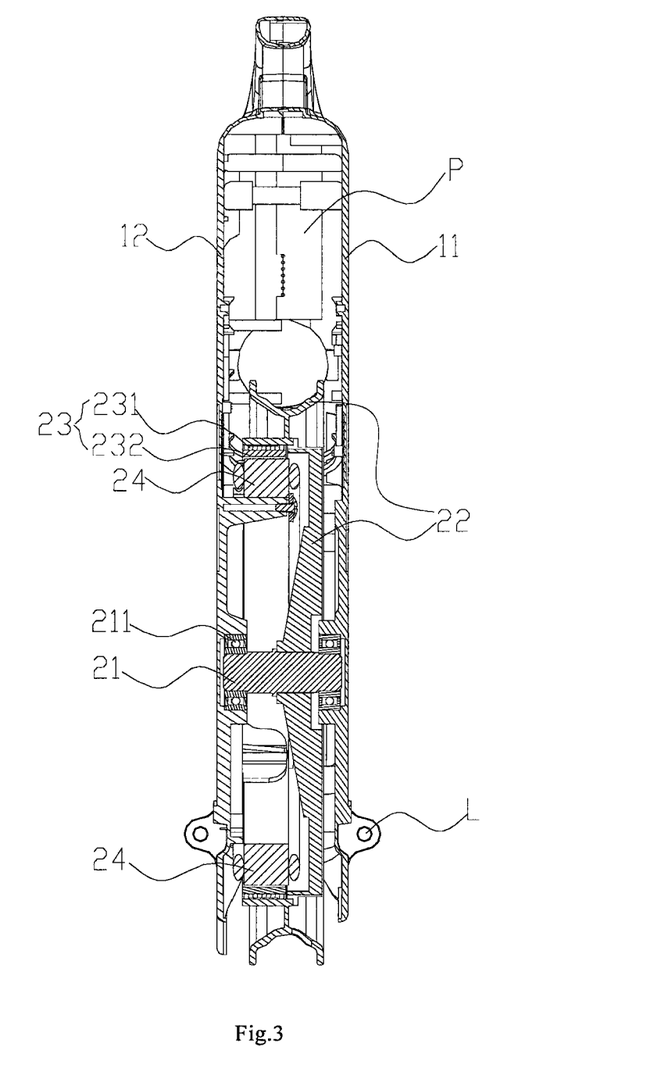
FIG. 3 is a sectional view of partial structure of the electric unicycle provided by the first embodiment of the invention.

The wheel hub motor 2 comprises a shaft 21, a hub 22, and a motor unit (without reference sign) for driving the rotation of the hub 22. The motor unit comprises a rotor 23 and a stator 24 which are arranged correspondingly to each other. The hub 22 is provided with a tyre 220.

In this embodiment, the stator 24 is fixedly mounted on the inner wall of the casing 1, the rotor 23 is arranged fixedly relative to the hub 22, and the hub 22 is rotatably mounted to the casing 1 by the shaft 21.

In this embodiment, the casing 1 comprises a first side casing 11 at one side of the wheel hub motor 2 and a second side casing 12 at the other side of the wheel hub motor 2.

In this embodiment, the first side casing 11 is the first wheel cover 11, and the second side casing 12 is the second wheel cover 12.

In this embodiment, the wheel hub motor 2 comprises one motor unit, the motor unit comprises one pair of stator 24 and rotor 23 which are arranged correspondingly to each other. The stator 24 is fixedly mounted on the inner wall of the second side casing 12, and the rotor 23 is fixedly mounted on the hub 22.

In an alternative embodiment of present invention, he wheel hub motor 2 comprises two or more motor units.

In some alternative embodiments of present invention, the rotor 23 and the stator 24 of each motor unit may be the patterns of "one corresponding to more", "more corresponding to one", or "more corresponding to more".

The electric vehicle further comprises an installation member 121 for fixedly mounting the stator 24.

In this embodiment, the installation member 121 is fixedly mounted on the inner wall of the casing 1. Preferably, the installation member 121 is used for detachably mounting the stator 24. Specifically, the inner wall of the second wheel cover 12 is provided with an installation member 121 for detachably mounting the stator 24.

In this embodiment, a circumferential stopping mechanism is configured between the installation member 121 and the stator 24 for preventing the stator 24 from moving in its circumferential direction relative to the installation member 121, and an axial stopping mechanism is configured between the installation member 121 and the stator 24 for preventing the stator 24 from moving in its axial direction relative to the installation member 121.

Figure 4:
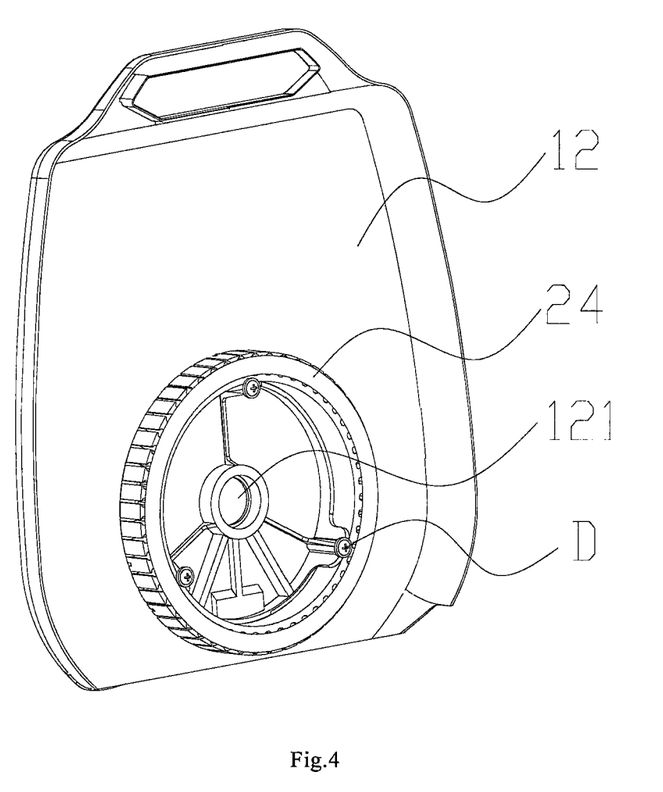
FIG. 4 is a perspective view of the assembled structure of the second side casing and the stator of the electric unicycle provided by the first embodiment of the invention.
Figure 5:
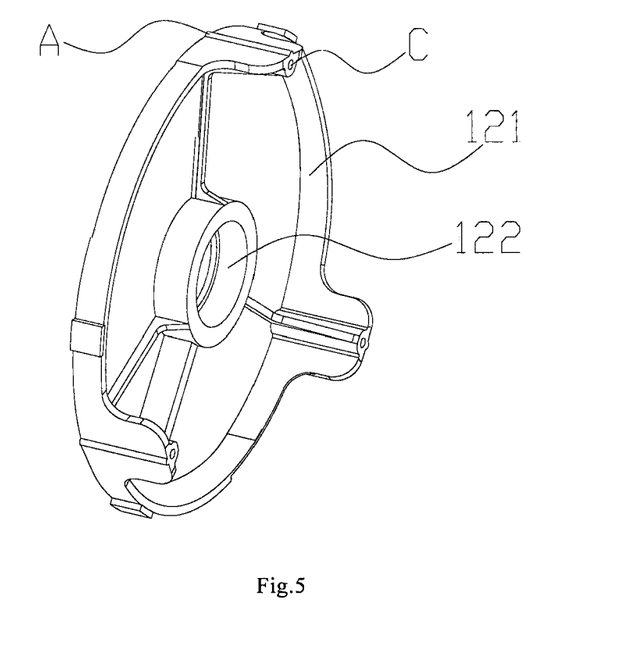
FIG. 5 is a perspective view of partial structure of the installation member of the electric unicycle provided by the first embodiment of the invention.

Specifically, as shown in FIGS. 4 and 5, the circumferential stopping mechanism comprises at least one protruded rib "A" extending in the axial direction and disposed on an outer circumference surface of the installation member 121 and at least one groove (not shown) correspondingly disposed on an inner circumference surface of the stator 24 and engaged with the protruded rib "A". In another alternative embodiment, the installation member 121 is provided with certain grooves and the stator 24 is provided with certain protruded ribs. And, the skilled persons in the art could apply other combination structures to realize the circumferential stopping.

As shown in FIGS. 4 and 5, the axial stopping mechanism comprises at least one pair of bolt "C" and bolt hole "D", the bolt hole "D" is disposed in the installation member 121 with extending in the axial direction. Specifically, the bolt hole "D" is disposed in the installation member 121 where the protruded rib "A" is. Since the stator 24 is engaged with the installation member 121 (such as protruded rib "A" and groove slip fit), the bolt "C" can be mounted into the bolt hole "D" and be fastened to realize the function of axial stopping for preventing the stator 24 from axially slipping out of the installation member 121.

Preferably, in this embodiment, as shown in FIGS. 4 and 5, the installation member 121 is provided with three circumferential stopping mechanisms and three axial stopping mechanisms, such a pattern of fixed installation is more firm.

In this embodiment, as shown in FIGS. 2 and 3, both side inner walls of casing 1 (namely, the inner wall of the first side casing 11 and the inner wall of the second side casing 12) are respectively provided with a blind hole 122 which is pivotally coupled to the shaft 21. Besides, a bearing 211 is arranged between the blind hole 122 and the shaft 21.

The connection between the hub 22 and the shaft 21 can be fixed or pivotable. In this embodiment, the hub 22 is fixedly connected with the shaft 21, and the shaft 21 is pivotally connected with the casing 1. In another alternative embodiment of the present invention, the hub 22 is pivotally connected with the shaft 21, and the shaft 21 is fixedly connected with the casing 1.

The rotor 23 is arranged fixedly relative to the hub 22. In this embodiment, the rotor 23 is fixedly arranged on the internal circumference surface of hub 22.

Figure 6:
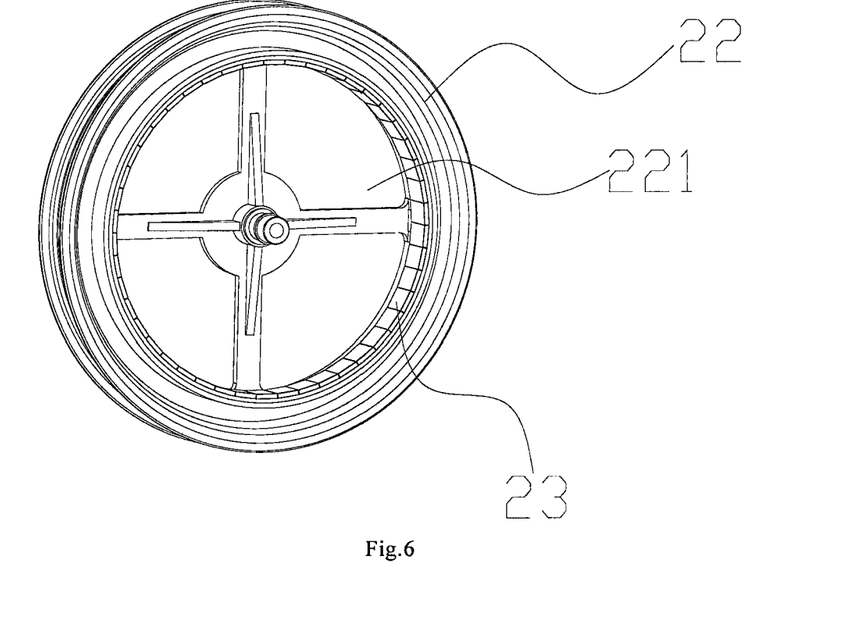
FIG. 6 is a perspective view of the assembled structure of the hub and the rotor of the electric unicycle provided by the first embodiment of the invention.

In this embodiment, as shown in FIGS. 2 and 3, the rotor 23 comprises an annular assembly of permanent magnets 231 arranged along the internal circumference surface of the hub 22 and being coaxial with the hub 22. As shown in FIGS. 2 and 6, the stator 24 comprises an annular assembly of permanent magnets (without reference sign) being coaxial with the hub 22 and coils enwinding such annular assembly of permanent magnets. Wherein, the structures of the rotor 23 and the stator 24 may employ a conventional structure in the art, for example, in this embodiment, both annular assemblies of permanent magnets of the rotor 23 and the stator 24 may be respectively composed by a plurality of pieces of rectangular permanent magnets (such as permanent magnets made of NdFeB (neodymium iron boron)) arranged successively to form in a round with each two adjacent permanent magnets having opposite polarities.

As shown in FIG. 4, while the wheel hub motor 2 is assembled inside the casing 1, the rotor 23 and the stator 24 are arranged correspondingly to each other for driving the rotation of the hub 22. The description of "rotor and stator are arranged correspondingly to each other" mentioned in this application document means the conventional pattern of corresponding arrangement between rotor and stator in a wheel hub motor. In this embodiment, the stator 24 is disposed inside a hollow space of the rotor 23 to make the stator 24 and the rotor 23 corresponding to each other. And in another alternative embodiment of the invention, the rotor 23 may be disposed inside a hollow space of the stator 24 to make the stator 24 and the rotor 23 corresponding to each other.

In this embodiment, as shown in FIG. 2 and FIG. 3, the rotor 23 further comprises an annular metal member 232 fixedly disposed on the internal circumference surface of the hub 22, and the annular assembly of permanent magnets 231 of the rotor 23 is attached on the internal circumference wall of the annular metal member 232.

In this embodiment, the annular metal member 232 may be made of iron. In this embodiment, the annular metal member 232 is molded integrally with the hub 2, namely, the annular metal member 232 is integrally formed on the internal circumference surface of the hub 22. During the manufacturing process, the one-piece structure of the hub 2 with the annular metal member 232 may be produced firstly, and then a plurality of pieces of permanent magnets may be successively made to be bonding to the internal circumference surface of the annular metal member 232 to form the annular assembly of permanent magnets 231.

In addition, in this embodiment, as shown in FIG. 2, the hub 22 further comprises a hub cover 221 at one side of the hub 22 (the right side shown in FIG. 2, the same side with the first side casing 11). As shown in FIG. 3, while the wheel hub motor 2 is assembled with the casing 1, a space is formed by both the hub cover 221 and the inner wall of the second side casing 12, the motor unit (the rotor 23 and the stator 24) are accommodated in the space. That is to say, the side casing at one side and the hub cover by the other side can form an enclosed space to seal the central portion of hub and the motor unit (the rotor and the stator), to serve the functions of waterproof and dustproof.

In another alternative embodiment of present invention, the stator 24 is mounted on the inner wall of the first side casing 11 and the hub cover is at the same side with the second side casing 12, thus, a space is formed by both the hub cover 221 and the inner wall of the first side casing 11, the motor unit (the rotor 23 and the stator 24) are accommodated in the space.

In other embodiments of the invention, the hub 22 may not have the hub cover 221.

In addition, as shown in FIGS. 1, 2 and 3, both lateral outer walls of the casing 1 are respectively provided with a connecting mechanism "L" for mounting the pedal 3 of the electric vehicle.

As compared with the solution in prior art which is that assembling the finished product of wheel hub motor into the electric vehicle directly, the inventor(s) of present invention dismantles the structure of the original finished product of wheel hub motor, specifically, discarding at least one hub cover and instead employing the casing of the electric vehicle for mounting the stator of wheel hub motor. Such solution simplifies the structures and reduces the weights of the wheel hub motor and the electric vehicle, moreover, it can reduce the gap between the casing and the wheel hub motor and thus decrease the overall thickness of the electric vehicle, especially decrease the thickness of the electric unicycle for easy to carry.

For example, the electric unicycle in prior art employing a finished product of the wheel hub motor with a diameter of 16 inches, may have a thickness of 140~200 mm and a weight of 12-15 kilograms. However, the electric unicycle with the structure of this embodiment may have its thickness decreased to 55~80 mm and its weight decreased to 6 kilograms.

Further, in this embodiment (referring to FIG. 3), the electronic control unit (such as batteries and circuit boards, etc.) is arranged in the internal space P of casing 1 (between the first side casing 11 and the second side casing 12) above the hub 22, thus the thickness of electric unicycle can be further decreased.

The structure of the wheel hub motor in this embodiment can also applied to two-wheeled electric vehicles or other suitable electric vehicles.

The Second Embodiment

The difference between the electric vehicle of the second embodiment and that of the first embodiment is that: they have different structures of the wheel hub motor.

Figure 7:
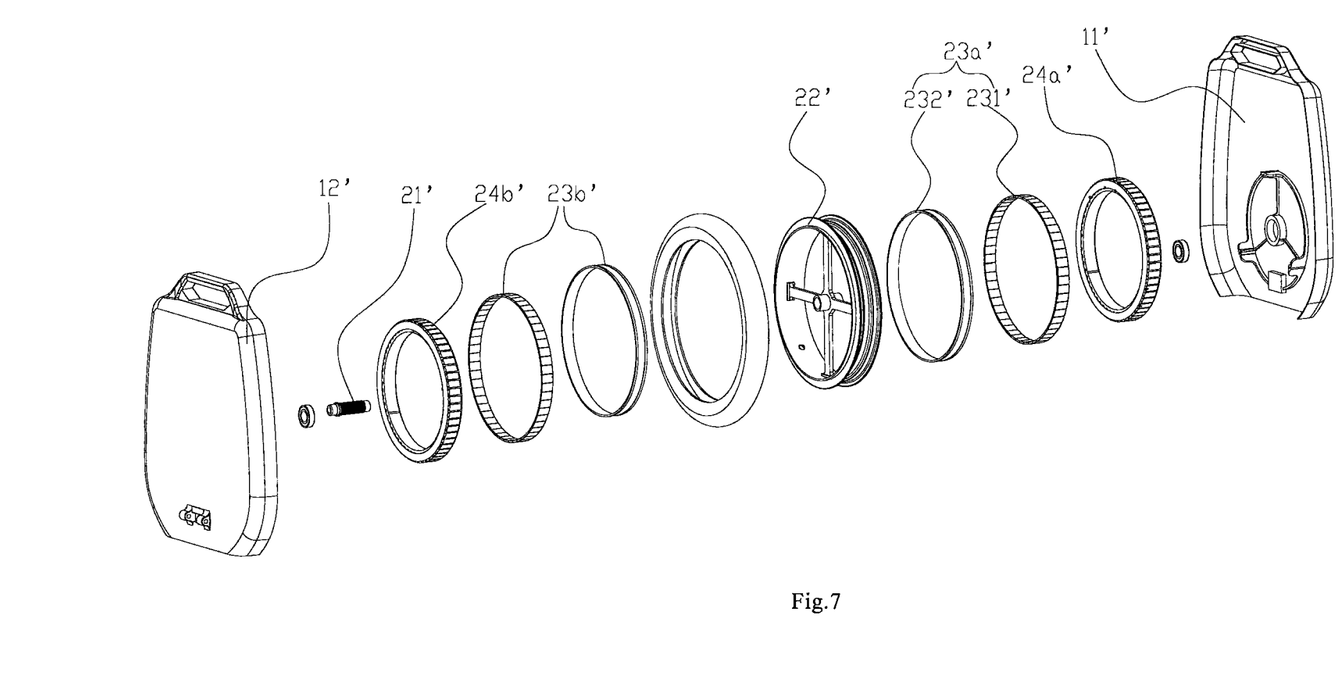
FIG. 7 is an exploded view of partial structure of the electric unicycle provided by the second embodiment of the invention.
Figure 8:
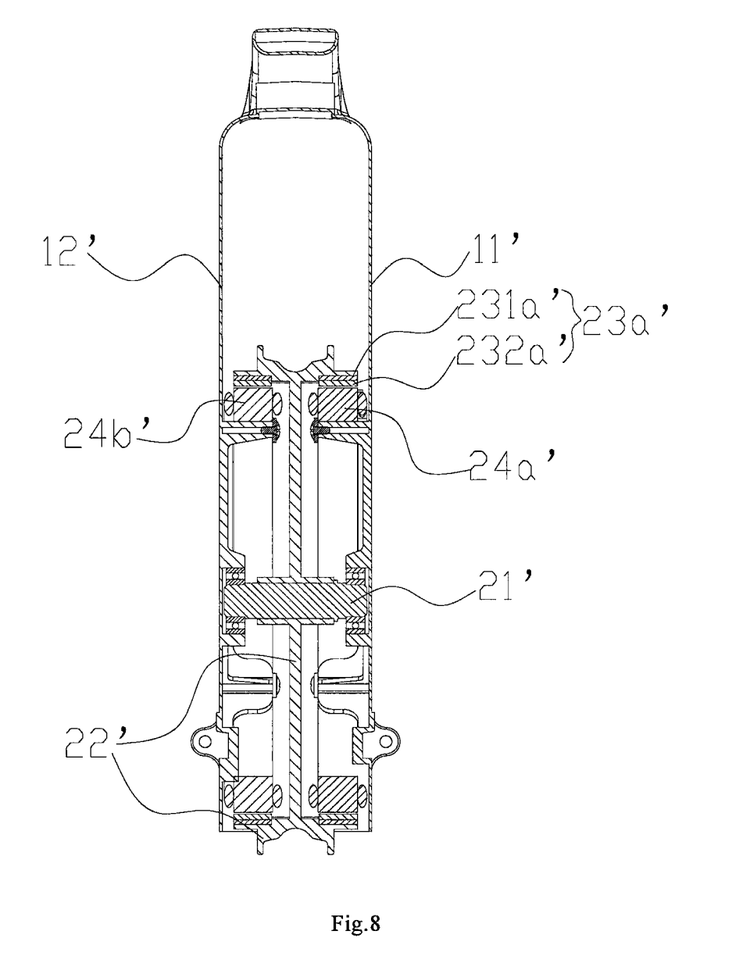
FIG. 8 is a sectional view of partial structure of the electric unicycle provided by the second embodiment of the invention.
Figure 9:
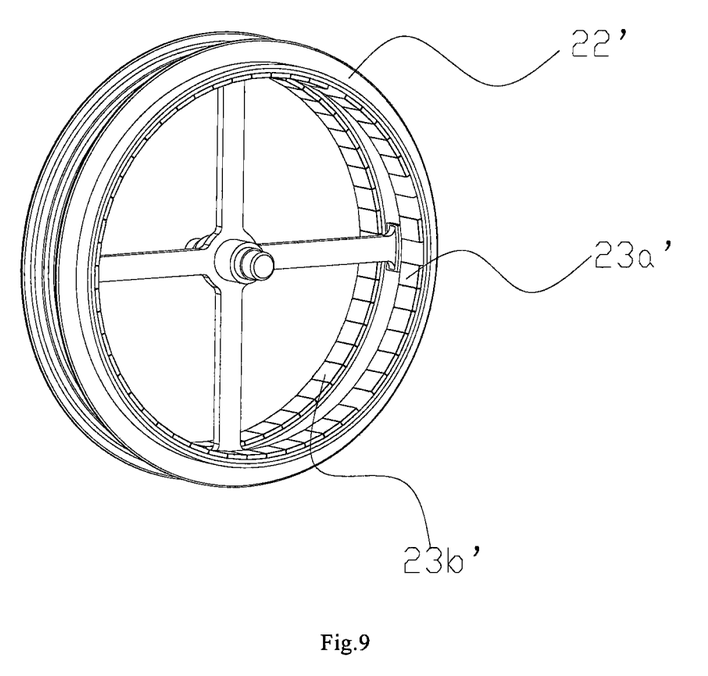
FIG. 9 is a perspective view of the assembled structure of the hub and the rotor of the electric unicycle provided by the second embodiment of the invention.

Specifically, referring to FIGS. 7 to 9, the wheel hub motor of the second embodiment, is disposed between the first side casing 11' and the second side casing 12' and comprises a shaft 21', a hub 22', and two motor units (without reference signs).

The two motor units are respectively the first motor unit (without reference signs) and the second motor unit (without reference signs).

The first motor unit comprises a first stator 24a' and a first rotor 23a'. The first stator 24a' is detachably fixed on the inner wall of the first side casing 11' by an installation member. The structures of the first stator 24a' and its installation member are the same as that of stator and installation member in the first embodiment, thus no more reiteration here.

The second motor unit comprises a second stator 24b' and a second rotor 23b'. The second stator 24b' is detachably fixed on the inner wall of the second side casing 12' by an installation member. The structures of the second stator 24b' and its installation member are the same as that of stator and installation member in the first embodiment, thus no more reiteration here.

The first rotor 23a' corresponding to the first stator 24a' and the second rotor 23b' corresponding to the second stator 24b' are fixedly mounted on the inner wall of the hub 22'.

The first rotor 23a' and the second rotor 23b' are coaxial and symmetrically disposed on the internal circumference surface of the hub 22', as shown in FIG. 9.

The first rotor 23a' comprises an annular metal member 232' fixedly disposed on the internal circumference surface of the hub 22', and an annular assembly of permanent magnets 231' attached on the internal circumference wall of the annular metal member 232'. The structure of the second rotor 23b' is same as that of the first rotor 23a', thus no more reiteration herein.

In this embodiment, as shown in FIG. 8, the hub 22' and the shaft 21' are fixedly connected with each other, and the shaft 21' is pivotally coupled with the casing 1'. The inner walls of the first side casing 11' and the second side casing 12' are respectively provided with a blind hole which is pivotally coupled to the shaft 21'. The other aspects of structure of the electric vehicle according to the second embodiment is similar with that of the electric vehicle according to the first embodiment, thus no reiteration herein.

The Third Embodiment

Figure 10:
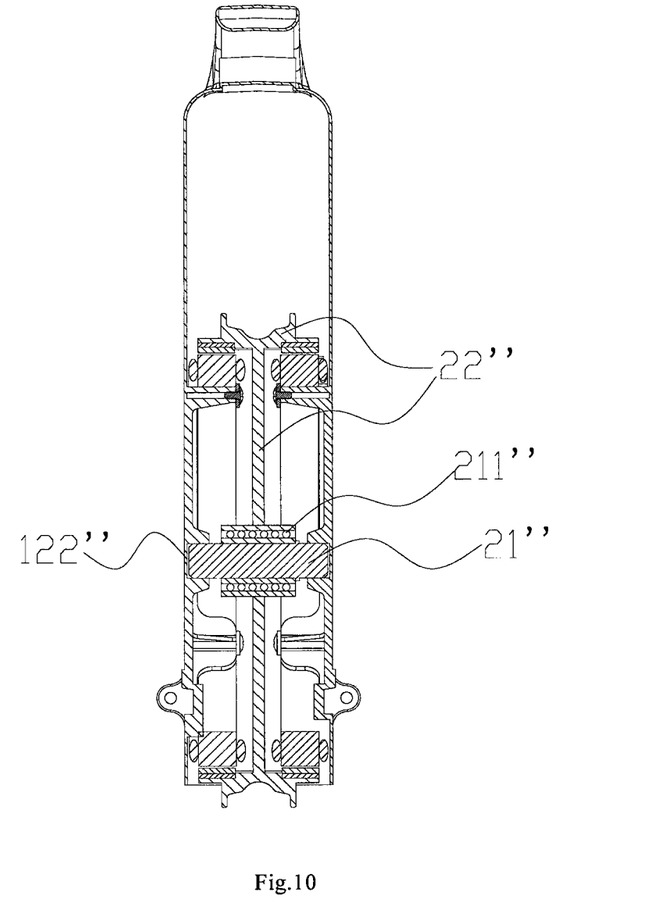
FIG. 10 is a sectional view of partial structure of the electric unicycle provided by the third embodiment of the invention.

The electric vehicle of the third embodiment differs from that of the second embodiment in that: the hub 22" and the shaft 21" are pivotally coupled with each other, and the casing 1" and the shaft 21" are fixedly connected with each other.

As shown in FIG. 10, the hub 22" is pivotally connected with the shaft 21" by a bearing 211".

Both the two sides of inner walls of the casing 1" are respectively provided with a blind hole 122" which is fixedly connected to the shaft 21".

The Fourth Embodiment

The electric vehicle of the fourth embodiment differs from that of the first embodiment in that: the structure of casing.

Figure 11:
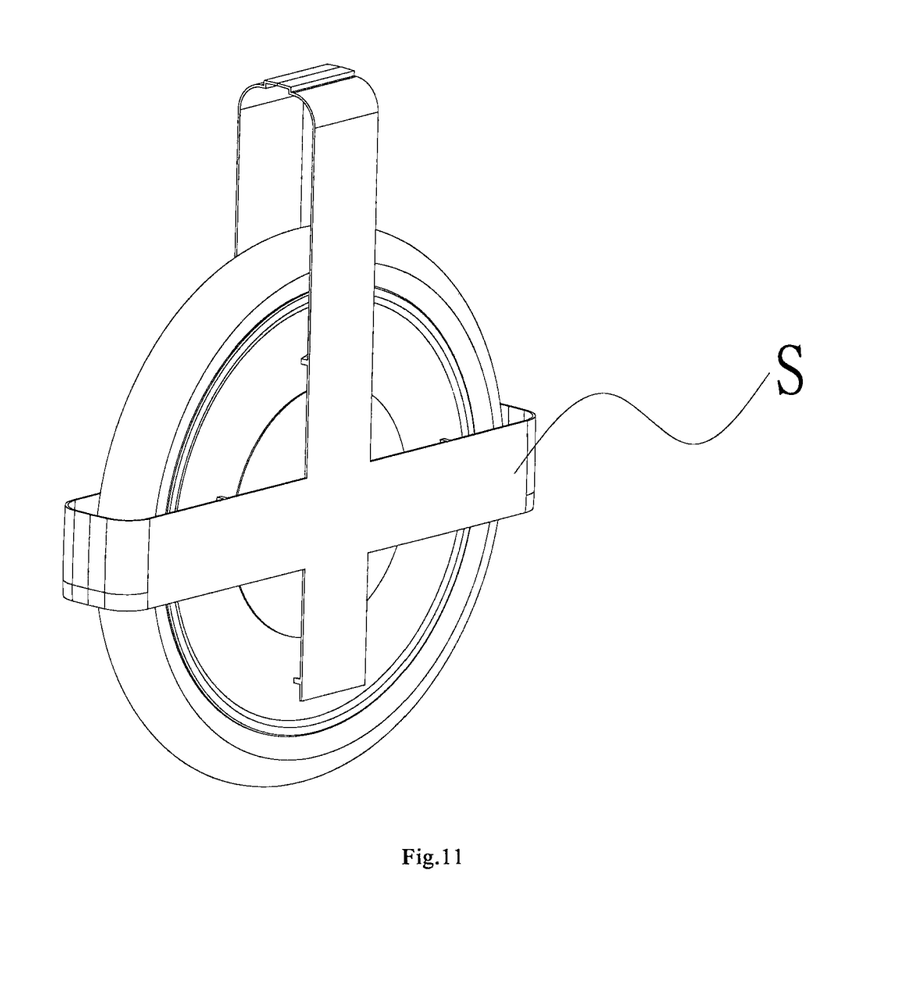
FIG. 11 is a perspective view of the electric unicycle (omitting the pedals) provided by the fourth embodiment of the invention.

As shown in FIG. 11, which is a perspective view of the electric unicycle (omitting the pedals) provided by the fourth embodiment of the invention, it can be seen that the casing is a wheel bracket S served as a casing.

The other aspects of structure of the electric vehicle according to the first embodiment is the same as that of in the first embodiment, thus no reiteration herein.

The Fifth Embodiment

The electric vehicle of the fifth embodiment differs from that of the second embodiment in that: the wheel hub motor of electric vehicle of the fifth embodiment has two hubs.

Figure 12:
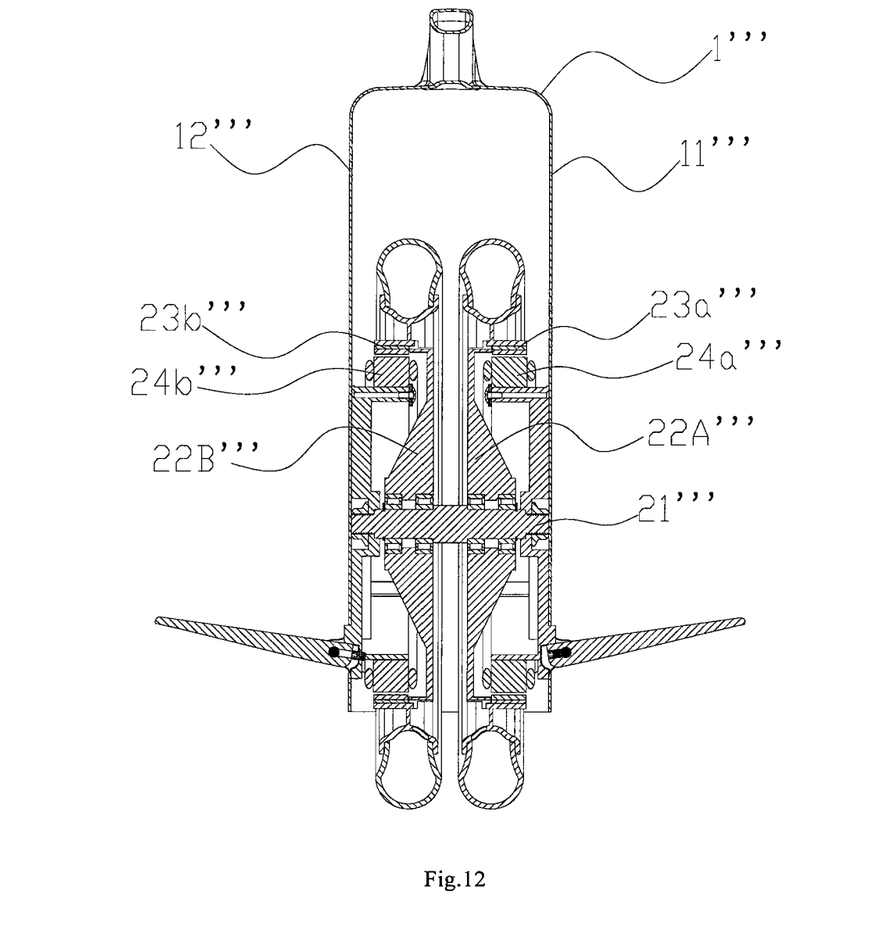
FIG. 12 is a sectional view of partial structure of the electric vehicle provided by the fifth embodiment of the invention.

As shown in FIG. 12, the electric vehicle provided by the fifth embodiment of the invention mainly comprises a casing 1''' and a wheel hub motor (with no reference signs) assembled inside the casing 1'''.

The wheel hub motor comprises a shaft 21''', a first hub 22A''', a first motor unit (with no reference signs) for driving the first hub 22A', a second hub 22B''' and a second motor unit (with no reference signs) for driving the second hub 22B'''.

The first hub 22A''' and the second hub 22B''' are both coupled to the shaft 21''' and have the same dimension.

The casing 1''' comprises a first side casing 11''' at side of the first hub 22A''' and a second side casing 12''' at side of the second hub 22B'''.

The first motor unit comprises a first stator 24a''' and a first rotor 23a''' which are arranged correspondingly to each other. The first stator 24a''' is detachably fixed on the inner wall of the first side casing 11''', and the first rotor 23a''' is fixedly mounted on the internal circumference surface of the first hub 22A'''.

The second motor unit comprises a second stator 24b''' and a second rotor 23b''' which are arranged correspondingly to each other. The second stator 24b''' is detachably fixed on the inner wall of the second side casing 12''', and the second rotor 23b''' is fixedly mounted on the internal circumference surface of the second hub 22B'''.

The other aspects of structure of the electric vehicle according to the fifth embodiment is the same as that of in the second embodiment, thus no reiteration herein.

The Sixth Embodiment

Figure 13:
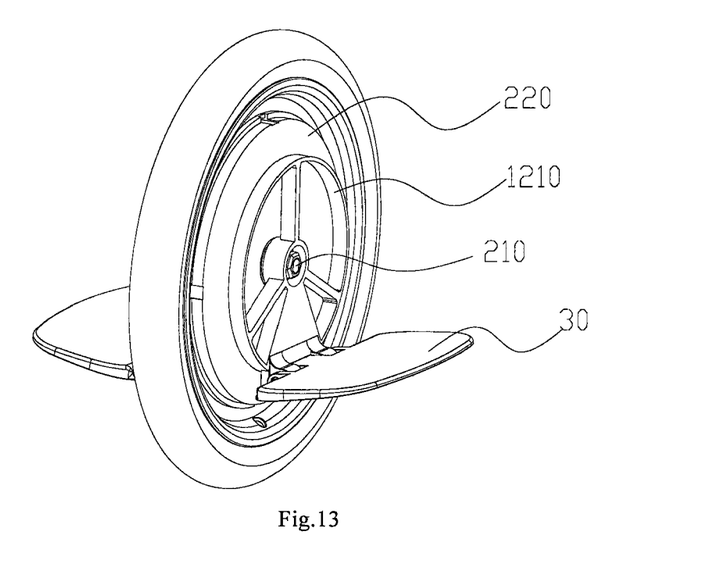
FIG. 13 is a perspective view of the electric vehicle (omitting the casing) provided by the sixth embodiment of the invention.
Figure 14:
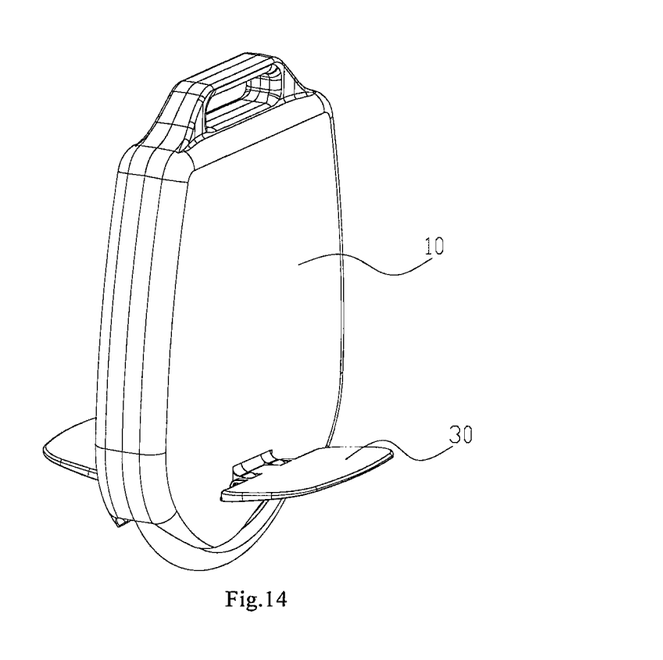
FIG. 14 is a perspective view of the whole electric vehicle provided by the sixth embodiment of the invention.

The electric vehicle of the sixth embodiment differs from that of the first embodiment in that: 1) the hub 220 is pivotally connected with the shaft 210, and the casing 10 is fixedly connected with the shaft 210; 2) there is an installation member 1210 at each of two sides of the hub 220; and the two installation member 1210 are not directly fixed on the inner walls of the casing 10, but fixedly coupled to the shaft 210, thereby arranged fixedly relative to the casing 10.

Specifically, as shown in FIG. 13 which is a perspective view of the electric vehicle (omitting the casing) provided by the sixth embodiment of the invention, the hub 220 is pivotally connected with the shaft 210, and each of two installation members 1210 is provided with a through hole engaged with the shaft 210 to realize the fixed connection between the installation member 1210 and the shaft 210.

The pedal 30 may be pivotally mounted on the outer wall of the installation member 1210 at the same side.

As shown in FIG. 14, the casing 10 can cover the outside of the wheel from top down to conceal the hub 220, the installation members and so on inside the casing 10, besides, the casing 10 is fixedly connected with the shaft 210 (not shown) to realize the relative fixation relationship between the casing 10 and the two installation members 1210.

The other aspects of structure of the electric vehicle according to the sixth embodiment is the same as that of in the first embodiment, thus no reiteration herein.

It can be understood that the above description only illustrates preferred embodiments of the invention, which can't be used for limiting the scope of the invention. Therefore, any other equivalent deformations or modifications without departing from the spirit of the invention are intended to be included in the scope of invention.

What is claimed is:

1. An electric vehicle, comprising a wheel casing and a wheel hub motor assembled inside said wheel casing, said wheel casing at least partially covering each of two opposite sides of said wheel hub motor, an internal space is formed inside the wheel casing, wherein,
said wheel hub motor comprises a shaft, a hub and a motor unit for driving the rotation of said hub;
said motor unit comprises a stator and a rotor which are arranged correspondingly to each other;
said electric vehicle further comprises an installation member for fixedly mounting said stator relative to said wheel casing;
said installation member is fixedly mounted on an inner wall of said wheel casing, said stator is fixedly mounted on the inner wall of said wheel casing through said installation member, and said stator and said installation member are both accommodated completely in the internal space of the wheel casing;
said rotor is arranged fixedly relative to said hub; and, said hub is rotatably connected to said wheel casing by said shaft;
two inner walls of said wheel casing are respectively provided with a blind hole which is pivotally or fixedly coupled to said shaft.

2. The electric vehicle according to claim 1, wherein, said wheel casing comprises a first side wheel casing and a second side wheel casing arranged by the two opposite sides of said wheel hub motor, respectively;
said internal space is formed between said first side wheel casing and said second side wheel casing, and said motor unit is accommodated completely in said internal space.

3. The electric vehicle according to claim 2, wherein, said wheel hub motor further comprises a first hub cover disposed at one side of said hub;
said first hub cover and said first side wheel casing are at the same side, a space is formed between said first hub cover and said second side wheel casing, and said installation member and said motor unit are accommodated completely in the space; or,
said first hub cover and said second side wheel casing are at the same side, a space is formed between said first hub cover and said first side wheel casing, and said installation member and said motor unit are accommodated completely in the space.

4. The electric vehicle according to claim 1, wherein, said wheel hub motor comprises one hub, which is arranged with at least one motor unit correspondingly, and each of said motor unit comprises at least one said stator and at least one said rotor which are arranged correspondingly to each other.

5. The electric vehicle according to claim 1, wherein, said installation member comprises a plurality of supporting members, said supporting members are arranged uniformly on a circle on the inner wall of the wheel casing;
said stator is sheathed outside the circle formed by said supporting members, or said stator is inserted inside the circle formed by said supporting members.

6. The electric vehicle according to claim 5, wherein, said supporting member and the wheel casing are molded in one body.

7. The electric vehicle according to claim 5, wherein, said installation member is used for detachably mounting said stator, and,
a circumferential stopping mechanism is configured between said installation member and said stator for preventing said stator from moving in its circumferential direction relative to said installation member, and an axial stopping mechanism is configured between said installation member and said stator for preventing said stator from moving in its axial direction relative to said installation member.

8. The electric vehicle according to claim 7, wherein, said circumferential stopping mechanism comprises at least one protruded rib extending in the axial direction and disposed on an outer circumference surface of installation member and at least one groove correspondingly disposed on an inner circumference surface of said stator and engaged with said protruded rib;
said axial stopping mechanism comprises at least one pair of bolt and bolt hole, said bolt hole is disposed in said installation member with extending in the axial direction.

9. The electric vehicle according to claim 8, wherein, each protruded rib is disposed on an outer surface of one supporting member, each bolt hole extends inside one supporting member along the axial direction.

10. The electric vehicle according to claim 1, wherein, said hub is fixedly connected with said shaft, and said shaft is pivotally connected with said wheel casing.

11. The electric vehicle according to claim 1, wherein, said hub is pivotally connected with said shaft, and said shaft is fixedly connected with said wheel casing.

12. The electric vehicle according to claim 11, wherein, said installation member is fixedly mounted on said shaft.

13. The electric vehicle according to claim 1, wherein, said stator is disposed inside a hollow space of said rotor to allow said stator and said rotor corresponding to each other, or said rotor is disposed inside a hollow space of said stator to allow said stator and said rotor corresponding to each other.

14. The electric vehicle according to claim 13, wherein, said rotor comprises an annular assembly of permanent magnets and an annular metal member;
said annular metal member fixedly disposed on the internal circumference surface of said hub, and said annular assembly of permanent magnets is attached on the internal circumference wall of said annular metal member.

15. The electric vehicle according to claim 14, wherein, said annular metal member is molded integrally with said hub.

16. The electric vehicle according to claim 1, wherein, said wheel casing is selected from a cover, a covering net, a bracket or the combination thereof.

17. The electric vehicle according to claim 1, wherein, said electric vehicle is a self-balancing electric vehicle.

18. An electric vehicle, comprising a wheel casing and a wheel hub motor assembled inside said wheel casing, said wheel casing at least partially covering each of two opposite sides of said wheel hub motor, an internal space is formed inside the wheel casing, wherein,
said wheel hub motor comprises a shaft, a hub and a motor unit for driving the rotation of said hub;
said motor unit comprises a stator and a rotor which are arranged correspondingly to each other;
said electric vehicle further comprises an installation member for fixedly mounting said stator relative to said wheel casing;
said installation member is fixedly mounted on the inner wall of said wheel casing, said stator is fixedly mounted on the inner wall of said wheel casing through said installation member, and said stator and said installation member are both accommodated completely in the internal space of the wheel casing;
said rotor is arranged fixedly relative to said hub; and, said hub is rotatably connected to said wheel casing by said shaft,
wherein, said wheel hub motor comprises two hubs which are both coupled to said shaft and have the same dimension, each of said hubs is arranged with at least one motor unit correspondingly, and each of said motor units comprises at least one said stator and at least one said rotor which are arranged correspondingly to each other.

* * * * *